United States Patent Office 3,137,659
Patented June 16, 1964

3,137,659
WEAKLY BASIC ANION EXCHANGE RESINS
George T. Kekish, Chicago, Ill., assignor to Nalco Chemical Company, Chicago, Ill., a corporation of Delaware
No Drawing. Filed Oct. 19, 1959, Ser. No. 847,109
6 Claims. (Cl. 260—2.1)

This invention relates to ion exchange methods and to water-insoluble, resinous polymerization products having marked and valuable properties of ion absorption, adsorption, or exchange, and to new and improved methods for preparing such products. In particular, the invention is directed to so-called weakly basic anion exchange resins.

Ion exchange materials are well known in the art. Such materials have the ability to exchange ions between a solid and liquid without substantially altering the structure of the solid. Ion exchange resins have been used extensively for removing electrolytes from water in operations known as desalting, demineralization, and/or deionization. Additionally, ion exchange processes are employed in the beverage, drug, electroplating, petroleum, sugar and waste treatment industries among others, for purification or other purposes.

Synthetic ion exchange resins are conventionally divided into four categories. They are: strong acid resins, strong base resins, weak acid resins, and weak base resins. Weak base resins are capable of acting on anions of weak acids such as silica and hydrocyanic acid. These resins generally have little or no salt splitting capacity. They are highly ionized only when in a salt form and, therefore, have ion exchange activity only below pH 7. Their principal function is to remove free acids from solutions.

One of the problems involved in using weakly basic anion exchange resins such as those of the polyamine type or those formed from polystyrene lies in the fact that they show considerable chemical instability in the presence of oxidizing agents. The ability of an ion exchange resin to resist degradation caused by aggressive chemical solutions, to a large extent determines its usefulness in commercial operations. Even though a resin may have a high operating capacity and may have good physical stability, it must also be capable of resisting the action of oxidizing agents if it is to be used in most industrial operations.

It is, therefore, an object of the present invention to provide a weakly basic anion exchange resin that is highly stable in the presence of oxidizing agents.

Another object of the invention is to provide a method of preparing and a method of using oxygen-stable anion exchange resins.

Still another object is to provide oxygen-stable resins which also have a satisfactory operating capacity and are capable of being regenerated without difficulty.

A further object is to provide an improved method of preparing beads of a weak base anion exchange resin.

Another object is to provide an improved and simplified method of quaternizing or partially quaternizing weak base anion exchange resins.

Other objects will become apparent from the following detailed description of the invention.

In general, it has been found that anion exchange resins made from ammonia and epichlorohydrin have much improved oxygen stability. More particularly, resins having a molar ratio of from about 1.5 to 4 mols of ammonia to each mol of epichlorohydrin provide highly satisfactory anion exchange materials. It has also been discovered that superior weak base resin beads can be produced by adding a polymeric water system to a hydrocarbon system in the presence of a dispersing agent and in the presence of additional epichlorohydrin. I have also discovered that epichlorohydrin-ammonia anion exchange resins can be quaternized or partially quaternized in an improved manner by using epichlorohydrin as the sole quaternizing agent.

Epichlorohydrin has previously been condensed with ammonia to form water-soluble products that are useful in the dyeing and printing arts. In a prior application of mine, Serial Number 736,960, filing date May 22, 1958, I described water-soluble coagulating agents prepared from epichlorohydrin and aqueous ammonia solutions. My prior application is included by reference in the present application.

In preparing the subject water-insoluble resins it is preferred to add the epichlorohydrin to the ammonia solution. The ammonia solution can be made up by adding ammonia hydroxide to water up to its saturation point. The solubility of ammonia in water is such that solutions containing approximately 32% by weight of ammonia can be prepared at room temperature. Commercial aqueous ammonia solutions containing about 28% by weight of ammonia, may be employed with good success in the production of anion exchange resins of the instant invention. The addition of epichlorohydrin to the ammonia solution should be carried out rather slowly in order to maintain the temperature below about 95° C. if the resin is to be in bead form. If the resin is to be granulated, the reaction temperature should be kept below about 103° C. Rapid additions of the epichlorohydrin to the ammonia solution require careful temperature control. At the end of the addition, the blend is a dependent polymeric liquid. At room temperature this liquid sets up into a gel within about one hour. If the resin is to be granulated, the heating can be continued until the material gels. As was pointed out above, it is essential that the molar ratio of ammonia to epichlorohydrin be maintained between about 1.5–4:1. It is also essential that the ammonia be dissolved in water rather than being in its gaseous state. The reaction can conveniently be carried out at atmospheric pressure. If it is desired, however, the reaction can be subjected to pressures up to about 100 p.s.i. In such instances, the temperature under which the reaction is carried out could be increased.

EXAMPLE I

This example illustrates the preparation of granules of ammonia-epichlorohydrin resin. To 3 mols of 28% aqueous solution of $NH_3$, 1 mol of epichlorohydrin was added slowly with stirring at atmospheric pressure. An exothermic reaction took place and after one hour the mixture gelled. The temperature of the reaction was not allowed to exceed about 103° C. The gel was dried in an oven at 90° C. and then crushed into small pieces. The pieces were washed with water on a 50 mesh screen.

EXAMPLE II

This example illustrates the preparation of beads of ammonia-epichlorohydrin resin. One hundred and eighty-two (182) grams (3 mols) of a 28% aqueous ammonia solution was placed in a 500 ml. flask after which 92.5 grams (1 mol) of epichlorohydrin was added with stirring over a period of one hour. An exothermic reaction took place during which the temperature went up to 90° C. The resultant clear, transparent polymeric liquid was then cooled to room temperature. Prior to cooling, the material had a viscosity of about 40 c.p.s.

Three hundred (300) ml. of toluene and 3 grams of Ethomid R/25 (a nonionic detergent type of dispersant which is formed by adding ethylene oxide to oleic acid) was placed in a 500 ml. flask which was equipped with a stirrer, condenser, thermometer, Y tube, and a Dean and Stark water trap. Ninety (90) grams of the polymeric liquid prepared as described above were then added to the flask with stirring. After 5 minutes, 10 grams of epichlorohydrin was added to the mixture whereupon the mixture was heated to reflux the material. The polymeric liquid gelled in bead form. The speed of stirring was adjusted to obtain the desired size of beads. Water was azeotropically removed from the mixture by means of the water trap. When the temperature reached 110° C. and no more water was collected, the mixture was cooled and filtered. White to slightly yellowish beads were obtained by the process.

The above described method of preparing beads of an anion exchange resin is a modification of the process described in U.S. Patent No. 2,610,156. In both processes, liquid resin material is added with stirring to a nonsolvent media along with a dispersant. The polymer is broken into droplets and becomes dispersed in toluene or other suitable media. Upon heating the polymer, the droplets become increasingly viscous and eventually gel. It has been found that the method described in U.S. Patent No. 2,610,156 is not satisfactory in producing beads of epichlorohydrin-aqueous ammonia resin. Without the subject modification of the process, the beads lump together forming particles of varying size and uniformity. By adding from 1 to 5% of epichlorohydrin by weight based on the volume of toluene or other media to the system, however, the gelation of the polymer particles is accomplished rapidly forming a coating on the beads and preventing them from lumping together or agglomerating. This method results in the formation of harder and more uniform beads.

There are a number of materials that can be substituted for toluene as the nonsolvent media used in the bead forming process. Such compounds include benzene, xylene, O-dichlorobenzene, ethylene dichloride, propylene dichloride, aliphatic hydrocarbons and chlorinated hydrocarbons from $C_6$ to $C_{10}$, and various aromatic hydrocarbons. A suitable list of materials is set forth in U.S. Patent No. 2,610,156. The organic nonsolvent must have a boiling point of at least 70° C.

The nonionic surface active agents or dispersants disclosed in U.S. Patent 2,610,156 are also suitable for use in the present process. These dispersants in general are ethylene oxide addition products of acids, amines, amides, alcohols, etc., containing an alkyl group of from 8 to 18 carbon atoms. The compound used in the above example, Ethomid R/25, is formed by condensing 15 mols of ethylene oxide with 1 mol of oleic acid. In general, from about 0.01 to about 3% of surface active agent can be used in the process based on the weight of the nonsolvent media.

In preparing beads of my anion exchange resin, the dependent polymeric liquid should have a viscosity of from about 20 to 100 cps. prior to being cooled to room temperature. A convenient means of determining the point at which the reaction between ammonia and epichlorohydrin has proceeded far enough is to begin the cooling when the mixture reaches a viscosity of about 40 cps. Under atmospheric pressure the reaction will have proceeded far enough after from about one-half to about 2 hours, and preferably after about one hour.

EXAMPLE III

This example describes a method of quaternizing ammonia-epichlorohydrin beads. A thirty (30) gram quantity of epichlorohydrin-ammonia beads prepared as shown in Example II was placed in a 500 ml. flask. Eighty-five (85) grams of a 12% solution of NaOH was added to the beads followed by 15 grams of allyl chloride. The mixture was heated and refluxed for one hour and ten minutes. Fifteen (15) grams of epichlorohydrin was then added to the mixture after which the refluxing was continued for an additional hour. Following the addition of 10 ml. of 50% NaOH, the reaction mixture was cooled to room temperature and filtered. After washing the beads with water, they were found to be both transparent and spherical. The granular material described in Example I can be quaternized by the same procedure.

Several other quaternizing agents may be used in place of allyl chloride in the above process. These agents include benzyl chloride, dimethyl sulfate, diethyl sulfate, methylol bromide, ethylene dichloroide, and the like. A suitable quaternizing method is described in U.S. Patent No. 2,543,666.

EXAMPLE IV

This example illustrates an improved method of quaternizing or partially quarternizing my weak base anion exchange resins. A 30 gram quantity of ammonia-epichlorohydrin beads prepared as shown in Example II was placed in a 500 ml. flask. Seventy-five (75) ml. of 5% NaOH solution and 10 grams of epichlorohydrin were added to the flask. The mixture was stirred for 15 minutes at room temperature and then filtered and washed with water. The resultant resin had a 56.0% water-holding capacity, a total capacity of 2.18 meq./ml. (9.62 meq./g.), and a column capacity of 21.4 kilograms per cubic foot of resin (as $CaCO_3$).

The above method of quaternizing or partially quaternizing the epichlorohydrin-ammonia resin can be carried out simply and efficiently. The process does not require the use of allyl chloride or other conventional quaternizing agents. The amount of epichlorohydrin used in the method can vary from about 20 to about 35% by weight of epichlorohydrin based on the weight of the resin.

EXAMPLE V

The following table sets forth the results of 1 to 3 week oxidation tests of the subject anion exchange resins as compared with several other well known weak base anion resins. Oxidation stability is determined by passing 180° F. water through 25 ml. of resin in a column having a ¾" diameter (the resin is three inches high in the column) at a rate of 140 to 150 ml. per minute flow rate. The column capacity is determined on the resin before and after the oxidation test, and the loss in capacity is indicative of the extent of the oxidation.

*1 and 3 Week Oxidation Stability Test*

| Commercial Resin | Initial oper. col. cap., kgr./cu.ft. | After 1 week of oxid. test, kgr./cu.ft. | Percent loss or gain | After 3 weeks of oxid. test, kgr./cu.ft. | Percent loss or gain |
|---|---|---|---|---|---|
| 1 | 24.3 | 14.1 | −42.0 | 0 | Lost 100%. |
| 2 | 28.4 | 24.9 | −12.3 | 18.8 | Lost 33.8%. |
| 3 | 20.6 | 23.5 | +14.1 | 22.1 | Gained 7.3%. |
| 4 | 17.2 | 20.7 | +20.3 | 22.3 | [1] Gained 29.7%. |
| 5 | 23.7 | 22.3 | −5.9 | 15.7 | Lost 25.4%. |
| EPI-NH₃ gran. quat.[2] | 22.4 | 30.6 | +36.5 | 29.5 | Gained 31.8%. |

[1] Resin becomes sticky after 3 weeks of test.
[2] This resin was prepared as described in Example I and was quaternized as is described in Example IV.

As is evident from the above data, a resin prepared by the subject process gained 36.5% of capacity after one week and had an increased capacity of 31.8% after 3 weeks. The only resin that approached the stability of applicant's product was resin No. 4 which became sticky after 3 weeks of testing.

In addition to being highly stable in the presence of oxidizing agents, the subject anion exchange resins have other desirable characteristics. The following table sets forth the water-holding capacity, total capacity, operating capacity, and other properties of these resins.

| | WHC,[1] percent | Total Capacity | | No. of Elutions | Small Column Test | | Utilization |
|---|---|---|---|---|---|---|---|
| | | meq./g. | meq./ml. | | Tot. Cap., kgr./cu. ft. | Oper. Cap., kgr./cu. ft. | |
| EP1-NH₃, gran. not quater | 65.4 | 8.75 | 1.71 | | | | |
| EP1-NH₃, gran. quater | 46.6 | 8.46 | 2.70 | 1 | 45.5 | 22.4 | 49.2 |
| EP1-NH₃, beads quater | 54.8 | 8.00 | 2.04 | 1 | 32.1 | 15.8 | 49.3 |
| EP1-NH₃, beads quater | 51.9 | 7.84 | 2.09 | 1 | 35.7 | 19.2 | 53.8 |
| EP1-NH₃, beads not quater | 65.8 | 11.5 | 2.28 | 1 | 36.4 | 27.0 | 74.1 |

[1] Water-holding capacity.

As it is apparent from the above data, the resins have a high water-holding capacity as well as a high operating capacity. The number of elutions undergone by the resin is important in that it measures the rate at which the ions exchange. The data shows that the entire capacity of the resin was utilized in one elution. These resins also demonstrate a high utilization percentage.

It was pointed out above that the method of forming weak base resin beads disclosed in Example II is novel and produces improved results over conventional bead-forming methods. In this process, a polymeric liquid (water system) is added to a hydrocarbon system along with epichlorohydrin. It is the use of epichlorohydrin in this manner that provides an improved process over the patented art. It has been found that hard and uniform beads can only be produced when epichlorohydrin is used in this manner. Prior art processes when applied to epichlorohydrin-ammonia resins form particles of uneven size.

Obviously many variations and modifications of the invention as hereinbefore set forth may be made without departing from the spirit and scope thereof and, therefore, only such limitations should be imposed as are indicated in the appended claims.

The invention is hereby claimed as follows:

1. A method of forming beads of a weakly basic anion exchange resin which comprises adding epichlorohydrin to an aqueous solution of ammonia in a molar ratio of from about 1.5 to 4 mols of ammonia for each mol of epichlorohydrin at a temperature not exceeding about 95° C., whereby a dependent polymeric liquid is formed which liquid is capable of being cured to a water-insoluble anion active product; dispersing said liquid in an inert, organic nonsolvent liquid having a boiling point of at least about 70° C. with mechanical agitation and in the presence of a nonionic dispersing agent; maintaining the dispersion at an elevated temperature while adding to the mixture from about 1 to about 5% by weight of epichlorohydrin based on the volume of said organic nonsolvent liquid; and thereafter cooling the resinous beads that are formed in the process.

2. A method of forming beads of a weakly basic anion exchange resin which comprises adding epichlorohydrin to an aqueous solution of ammonia in a molar ratio of from about 1.5 to 4 mols of ammonia for each mol of epichlorohydrin at a temperature not exceeding about 95° C., whereby a dependent polymeric liquid is formed having a viscosity of from about 20 to 100 c.p.s.; dispersing said liquid in an inert, organic nonsolvent liquid having a boiling point of at least about 70° C. with mechanical agitation and in the presence of a nonionic dispersing agent; maintaining the dispersion at an elevated temperature while adding to the mixture from about 1 to about 5% by weight of epichlorohydrin based on the volume of said organic nonsolvent liquid; and thereafter cooling the resinous beads that are formed in the process.

3. An improved method of at least partially quaternizing a water-insoluble weakly basic anion exchange resin, which resin is formed by adding epichlorohydrin to an aqueous solution of ammonia in a molar ratio of from about 1.5 to 4 mols of ammonia for each mol of epichlorohydrin at a temperature not exceeding about 103° C., said method comprising adding to said anion exchange resin from about 20 to about 35% by weight of epichlorohydrin based on the weight of the resin, said addition taking place in the presence of an aqueous solution of sodium hydroxide.

4. A method of forming beads of a weakly basic anion exchange resin which comprises adding epichlorohydrin to an aqueous solution of ammonia in a molar ratio of from about 1.5 to 4 mols of ammonia for each mol of epichlorohydrin at a temperature not exceeding about 95° C., whereby a dependent polymeric liquid is formed having a viscosity of from about 20 to 100 cps.; dispersing said liquid in an inert, organic nonsolvent liquid having a boiling point of at least about 70° C. with mechanical agitation and in the presence of a nonionic dispersing agent; maintaining the dispersion at an elevated temperature while adding to the mixture from about 1 to about 5% by weight of epichlorohydrin based on the volume of said organic nonsolvent liquid; and thereafter adding to the resinous beads that are formed in the process an aqueous solution of sodium hydroxide and from about 20 to about 35% by weight of epichlorohydrin based on the weight of said resinous beads, whereby said resinous beads are quaternized.

5. A process for forming a weakly basic anion exchange resin which comprises slowly adding epichlorohydrin to an aqueous solution of ammonia with constant stirring whereby the reaction temperature is maintained below about 103° C., the molar ratio of the reactants being from about 1.5 to 4 mols of ammonia for each mol of epichlorohydrin, drying the resultant gel, and thereafter crushing the resinous material to form granules.

6. A process for forming a weakly basic anion exchange resin which comprises slowly adding epichlorohydrin to an aqueous solution of ammonia with constant stirring whereby the reaction temperature is maintained below about 103° C., the molar ratio of the reactants being from about 1.5 to 4 mols of ammonia for each mol of epichlorohydrin, drying the resultant gel, thereafter crushing the resinous material to form granules, and thereafter adding to said granules in the presence of an aqueous solution of sodium hydroxide from about 20 to about 35% by weight of epichlorohydrin based on the weight of the resinous material.

References Cited in the file of this patent

UNITED STATES PATENTS

| 2,104,092 | Munz | Jan. 4, 1938 |
| 2,610,156 | Lundberg | Sept. 9, 1952 |

FOREIGN PATENTS

| 771,836 | France | Oct. 18, 1934 |

OTHER REFERENCES

Helfferich: Ion Exchange, page 50 and page 60 (1962), McGraw-Hill, N.Y., Scientific Library Call No. QD, 561, H4.

Darmstaedter: Annalen der chemie und Pharmacie, vol. 148, pages 124–125 (1868), Scientific Library Call No. QD 1, L7.

UNITED STATES PATENT OFFICE
CERTIFICATE OF CORRECTION

Patent No. 3,137,659　　　　　　　　　　　　　　　　June 19, 1964

George T. Kekish

It is hereby certified that error appears in the above numbered patent requiring correction and that the said Letters Patent should read as corrected below.

Column 6, line 66, for "page 60" read -- page 69 --.

Signed and sealed this 3rd day of November 1964.

(SEAL)
Attest:

ERNEST W. SWIDER
Attesting Officer

EDWARD J. BRENNER
Commissioner of Patents